(12) United States Patent
Shaw

(10) Patent No.: US 6,209,562 B1
(45) Date of Patent: *Apr. 3, 2001

(54) VALVE ASSEMBLY, PRESSURE TESTING APPARATUS AND TESTING METHOD FOR PROPANE TANK SYSTEM

(75) Inventor: Jimmie Bryant Shaw, Carrollton, MS (US)

(73) Assignee: Presto-Tap, LLC, Cordova, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/517,519

(22) Filed: Mar. 2, 2000

Related U.S. Application Data

(63) Continuation-in-part of application No. 09/296,245, filed on Apr. 22, 1999, which is a continuation-in-part of application No. 09/105,264, filed on Jun. 26, 1998, now Pat. No. 5,992,438, which is a continuation-in-part of application No. 08/603,215, filed on Feb. 20, 1996, now Pat. No. 5,787,916.

(51) Int. Cl.⁷ .................................................. F16K 37/00
(52) U.S. Cl. .................. 137/15.18; 137/315.07; 137/557; 137/883; 73/40.5; 73/756
(58) Field of Search .............................. 241/146; 137/14, 137/557, 883, 15.18, 315.07; 73/40.5, 756

(56) References Cited

U.S. PATENT DOCUMENTS

| | | | |
|---|---|---|---|
| 483,106 | * 9/1892 | Dixon | 137/557 |
| 632,808 | * 9/1899 | Dunlap | 137/557 |
| 1,666,283 | * 4/1928 | Farley | 137/557 |
| 2,881,011 | * 4/1959 | Coullin | 137/557 |
| 2,923,312 | 2/1960 | Wagner . | |
| 3,517,693 | * 6/1970 | Dretz | 137/557 |
| 3,853,144 | * 12/1974 | Whelan | 137/883 |
| 3,891,002 | * 6/1975 | Mowrer et al. | 137/557 |
| 4,332,273 | 6/1982 | Boyce . | |
| 4,338,793 | 7/1982 | O'Hern, Jr. . | |
| 4,450,721 | 5/1984 | Gaunt et al. . | |
| 4,702,754 | 10/1987 | Blocker . | |
| 4,944,292 | * 7/1990 | Gaeke et al. | 137/883 |
| 4,976,134 | * 12/1990 | Potvin | 137/14 |
| 5,183,078 | 2/1993 | Sorrell . | |
| 5,404,905 | * 4/1995 | Lauria | 137/557 |
| 5,787,916 | * 8/1998 | Shaw | 137/14 |
| 5,992,438 | * 11/1999 | Shaw | 137/14 |

OTHER PUBLICATIONS

Product brochure for G–430 Leak Test Fitting; from Marshal Brass (Div. of S.H. Leggitt Co.); Marshall, MI, 1998.
Product brochure for FLO–LEK Meter; by Koch & Associates, Edmond, Oklahoma, 1998.
Product brochure for REGO gauges and valves, 1998.

\* cited by examiner

Primary Examiner—A. Michael Chambers
(74) Attorney, Agent, or Firm—Larson & Taylor, PLC

(57) ABSTRACT

A method and assembly (kit) are provided for use by propane tank service personnel to detect escaping gas in propane tank systems. In one embodiment, the standard connection between the regulator and tank service valve is replaced with a permanent valve arrangement including a main connection between the regulator and valve and a valve unit disposed in a branch connection of the valve assembly. In a second embodiment, a permanent valve assembly is screwed into a pressure port in the tank regulator system. A separate pressure gauge is individually assigned to tank service personnel and adapted to be carried by such personnel in testing the pressure in the propane tank. The pressure gauge is affixed, e.g., through a hose, to a valve unit connector including an actuator, e.g., a valve stem operator, for actuating the valve unit. When the pressure gauge is connected to the valve unit, the latter is actuated to provide an immediate reading of the tank pressure (depending, in the second embodiment, on the location of the pressure port). A determination is made from this reading whether the tank is out of gas, and if the tank is out of gas, the service valve is turned on, gas introduced, the service valve turned off and a further pressure check made to determine whether gas is leaking. In the second embodiment, the valve unit includes a valve housing with a restricted (0.054 inch or smaller) inlet.

20 Claims, 9 Drawing Sheets

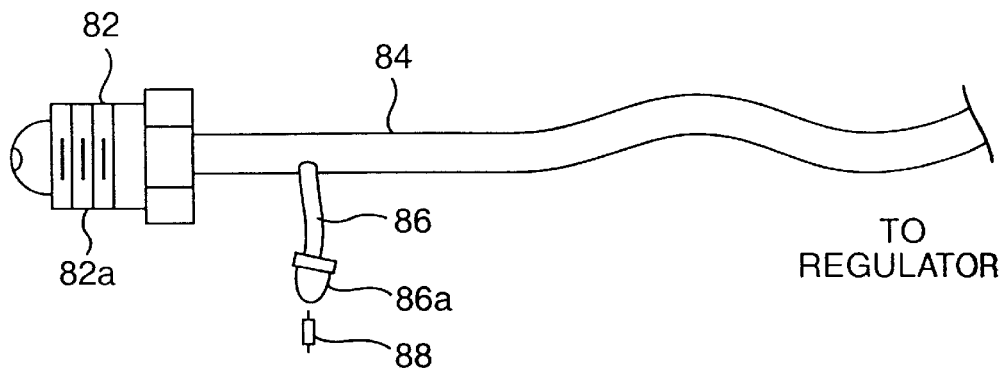
TO REGULATOR
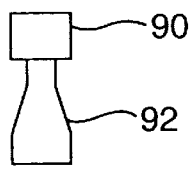
FIG. 6
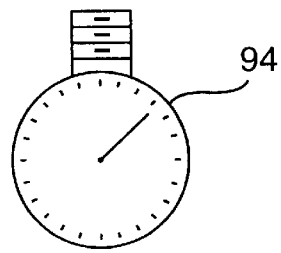
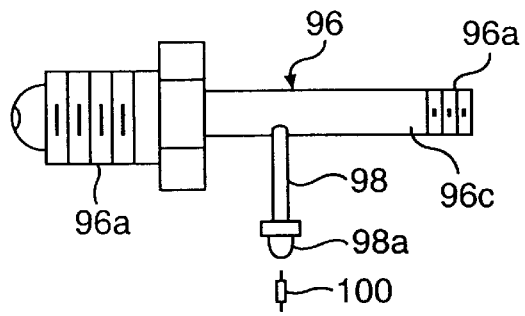
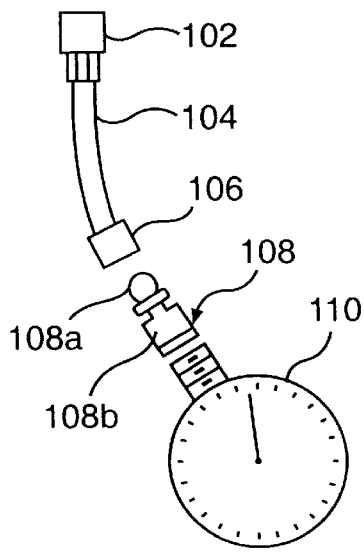
FIG. 7

TO WATER
MANOMETER OR
OUNCE GAUGE

VALVE ASSEMBLY, PRESSURE TESTING APPARATUS AND TESTING METHOD FOR PROPANE TANK SYSTEM

CROSS REFERENCE TO RELATED APPLICATION

This application is a continuation-in-part of U.S. Ser. No. 09/296,245, filed on Apr. 22, 1999, which is, in turn, a continuation-in-part of U.S. Ser. No. 09/105,264 filed on Jun. 26, 1998, now U.S. Pat. No. 5,992,438 which is, in turn, a continuation-in-part of U.S. Ser. No. 08/603,215, filed on Feb. 20, 1996, now U.S. Pat. No. 5,787,916.

FIELD OF THE INVENTION

The present invention relates to propane tank systems and, more particularly, to a valve unit, a testing assembly and a testing method for enabling repair personnel such as a driver-serviceman to readily check for leakage of propane gas from such a system.

BACKGROUND OF THE INVENTION

Propane gas leaks can obviously cause serious problems. For example, fires resulting from such leaks can cause both property damage and personal injury including, in extreme cases, death. Thus, a very real need exists for an approach in testing for such leaks that will effectively protect the homeowner-users of propane gas. Such protection would also be of substantial benefit to the companies that serve such homeowner-users particularly in the area of reducing the spiraling costs of lawsuits involving the leakage of gas into the home of a customer from the propane system. This leakage is often from appliances that have inadvertently been left on at the time of a gas outage in the propane tank. In any event, whatever the cause of such leakage, it is obviously very important to be able to readily determine when there is leakage from the system.

There are strict rules associated with the assembly and servicing of propane systems. The current rules are set out in NFPA Pamphlet 58. Considering the rules that bear on the issues involved with the present invention, NFPA Pamphlet 58, Section 3-2.10 states that "After assembly, piping systems (including hose) shall be tested and proven free of leaks at not less than operating pressure." Section 4.2.1 states that "Before gas is introduced into a system after being shut off, the entire system shall be inspected to determine that there are no open fittings or ends and all manual valves at outlets on equipment are closed and all unused valves at outlets are closed and plugged or capped." Section 4.2.2 states "Immediately after turning on the gas the piping system shall be tested to ascertain that no gas is escaping." In addition, section 4.3.4 describes the process for purging (emptying of air from) a system that has been opened and states "After the piping has been placed in operation, all equipment shall be purged and then placed in operation as necessary."

Section 4.1.4 of this pamphlet describes the methods of pressure testing and states as follows: "(a) Test pressure shall be measured with a manometer or with a pressure measuring device designed and calibrated to read, record, or indicate a pressure loss due to leakage during the pressure test period. The source of pressure shall be isolated before the pressure tests are made. (b) The test pressure to be used shall be no less than 1½ time the proposed maximum working pressure, but not less than 3 psig, irrespective of design pressure. Where the pressure exceeds 125 psig, the test pressure shall not exceed a value that produces a hoop stress in the piping greater than 50 percent of the specified minimum yield strength of the pipe. (c) Systems for undiluted liquefied petroleum gases shall withstand the pressure test in accordance with (b) above, or, for single-staged systems operating at a pressure of ½ psig or less, shall withstand a test pressure of $9.0 \pm \frac{1}{2}$ inch water column for a period of not less than 10 minutes without showing any drop in pressure. If the source of pressure for this test is a liquefied petroleum gas container, the container service valve shall be checked for positive shutoff with leak detector solution prior to the test, or shall be disconnected from the system during the test. (d) Test duration shall be not less than ½ hour for each 500 cubic feet of pipe volume or fraction thereof. When testing a system having a volume less than 10 cubic feet or a system in a single-family dwelling, the test duration shall be permitted to be reduced to 10 minutes. For a piping system having a volume of more than 24,000 cubic feet, the duration of the test shall not be required to exceed 24 hours." Finally, Section 4.1.2 (exception) states that "Fuel gas shall be permitted to be used in piping systems operating at pressures of 0.5 psig."

At present, there is no way for a driver-salesman or a service person, hereinafter referred to for convenience as a repairman or repair personnel, to check for leakage as described above without interrupting the gas piping, a process that is very time consuming. Further, this process introduces unwanted air into the system and thus requires such air to be purged.

There are, of course, many systems which use permanent valves and gauges for determining and/or controlling the pressure in the system. Reference is made in this regard to U.S. Pat. No. 2,923,312 (Wagner), U.S. Pat. No. 4,332,273 (Boyce) and U.S. Pat. No. 4,338,793 (O'Hern, Jr.) relating to refrigeration systems and to U.S. Pat. No. 4,702,754 (Blocker) relating to natural gas or propane delivery systems and U.S. Pat. No. 4,183,078 (Sorrell) relating to a combination shut-off and test-injection valve. Briefly considering some of these patents, the Wagner patent discloses a valve tool for charging and discharging refrigeration systems including a tee-adapter for testing gas pressures. The Boyce patent disclosed a leak-proof connector including a valve of the Schraeder (or Schroeder) type while the O'Hern, Jr. patent discloses an adapter for a refrigeration system which also uses a normally closed Schrader valve. The Blocker patent discloses a test adapter which permits pressure tests to be carried out on delivery systems for fuel gas, i.e., propane or natural gas.

Reference is also made to U.S. Pat. No. 5,070,962 (Peterson, Jr.) which discloses a split valve test plug for use in a high pressure pipe line to sense pressure or temperature using a test probe and gauge. The plug valve includes a valve housing which is threaded into a tapped threaded opening in the pipe line.

SUMMARY OF THE INVENTION

According to the present invention, a valve unit, a test assembly or kit and a method are provided which permit service or repair personnel to check a propane system for leaks at the time of introduction of propane into the system and which eliminates the need for the purging described above after the test. The service person is also assisted in ascertaining whether the system is actually out of gas, requiring interruption of service, in spite of the reading(s) provided by the tank gauge(s) since such gauges may be inoperative or may be giving false readings.

In accordance with a first aspect of the invention, a method is provided for use by propane tank service personnel in detecting escaping gas in propane tank systems including a regulator and a tank service valve connected together by a standard connector, the method comprising the steps of: replacing the standard connector with a permanent valve and connector assembly including first and second end connections and a branch connection portion, a valve unit disposed in said branch connection portion and including a valve stem actuable to open said valve unit, the replacing step including connecting said first and second end connections to the tank service valve and the regulator, respectively; and using a separate pressure gauge assembly individually assigned to tank service personnel and adapted to be carried by said personnel for testing the pressure in the propane tank, said pressure gauge assembly including a pressure gauge; a valve assembly connector including means for actuating the valve unit when the valve assembly connector is connected to the valve assembly, said testing of pressure comprising connecting the valve assembly connector of the pressure gauge assembly to the branch connection portion of the valve assembly to actuate the valve unit and thus provide an immediate reading of the tank pressure by said gauge, using the reading of tank pressure in determining whether the tank is out of propane gas, and thereafter taking one or the other of the following two steps depending on the determining step: if the tank is determined to not be out of propane gas, introducing gas into the tank as needed; and if the tank is determined to be out of propane gas, turning the tank service valve off, pressurizing the tank, turning the service valve on, introducing gas into the system to pressurize the system, thereafter turning the tank service valve back off again so as to isolate the gas introduced into the tank, and reading the gauge pressure to determine whether gas is escaping from the propane tank system. It will be appreciated that because each tank service person carries his or her own gauge assembly, a separate gauge is not necessary for each propane tank system and one gauge assembly only is needed by each service person.

In a preferred, advantageous embodiment, the gauge includes an indicating needle and further comprises a pressure scale and an ambient temperature scale calibrated relative to said pressure scale so that the position of the needle that provides a reading of gauge pressure on the pressure scale also provides a reading of the corresponding minimum ambient temperature on the ambient temperature scale, and the determining step for determining whether the tank is out of propane gas includes determining the actual ambient temperature and comparing the actual ambient temperature with the reading of said corresponding minimum ambient temperature.

According to a second aspect of the invention, a kit is provided for use in a propane tank system for enabling detection of escaping gas by tank repair personnel, the tank system including a standard connector connecting a regulator to a tank service valve, and the kit comprising: a valve and connector assembly for connection between the regulator and the service valve in place of the standard connector, the valve and connector assembly comprising a connector including end connections for connection to the regulator and the service valve, respectively, a main connector portion between the said end connectors, and a branch connector portion connected at one end thereof to the main connection portion, a valve unit disposed in the branch connector portion and including a valve stem actuable to open a connection to the main connector portion; and a separate pressure gauge assembly adapted to be carried by tank repair personnel and including a pressure gauge, and a mounting means, connected to the pressure gauge, for providing connection of the pressure gauge to the branch connector portion of the valve assembly, and for, when connected to said branch connector portion, providing actuation of the valve stem so that, in use with the tank service valve open, the pressure gauge provides a reading of the tank pressure and, in use with the system pressurized and the tank service valve closed, the gauge provides an indication of the presence of a leak or open line in the propane tank system.

The gauge preferably includes an indicating needle and further comprises includes a pressure scale and an ambient temperature scale calibrated relative to said pressure scale so that the position of the needle that provides a reading of gauge pressure on the pressure scale also provides a reading of the corresponding minimum ambient temperature on the ambient temperature scale.

The valve unit advantageously comprises a Schrader valve (also referred to as a Schraeder-Bridgeport valve). Further, the means disposed at the other end of the hose of the gauge assembly preferably includes a finger pressure operated screw-on connector. The latter feature enables the gauge assembly to be connected to the system without the use of wrenches or the like.

Preferably, the main connector portion includes at least one flexible portion. Advantageously, the at least one flexible portion comprises a pigtail section.

In one preferred embodiment, the branch connector portion is welded to the main portion. Advantageously, the main connector portion includes a pigtail section and the branch connector portion is welded to the pigtail section.

In another preferred embodiment, the connector includes a straight pipe connector and one of the end connectors comprises left-hand threading on the straight pipe connector for connection to the service valve.

In yet a further embodiment, the branch connector portion includes a quick coupling valve unit and the mounting means of said pressure gauge assembly includes a cooperating quick coupling connector.

In accordance with yet another aspect of the invention, a kit is provided for use in a propane tank system for enabling detection of escaping gas by tank repair personnel, the tank system including a standard connector connecting a regulator to a tank service valve, and the kit comprising: a valve and connector assembly for connection between the regulator and the service valve in place of the standard connector, the valve and connector assembly comprising a connector including end connections for connection to the regulator and the service valve, respectively, a main connector portion between the end connectors and including an outlet hole therein along its length, and a branch connector portion connected at one end thereof to the main connector portion and terminating in a free end, the branch connector portion comprising a saddle valve unit directly connected to the main connector portion over the outlet hole and including a valve stem actuable to open a connection from the connector to the free end of the branch connector portion, and a separate pressure gauge assembly adapted to be carried by tank repair personnel and including a pressure gauge, and mounting means, affixed to the pressure gauge, for providing connection of the pressure gauge to said free end of the branch connector portion of the valve assembly, and for, when connected to said free end of the branch connector portion, providing actuation of the valve stem so that, in use with the tank service valve open, the gauge provides a reading of the tank pressure and, in use with the system pressurized and the tank service valve closed, the gauge provides an indication of the presence of a leak or open line in the propane tank system.

Preferably, the saddle valve unit includes outwardly extending spaced legs which fit around the main connector portion and are welded or soldered to the main connector portion.

According to a still further aspect of the invention, a method is provided for use by propane tank service personnel in detecting escaping gas in a propane tank system including a regulator and a tank service valve connected together by a valve and connector assembly including first and second end connections connected to the tank service valve and the regulator, respectively, a branch connection portion, and a valve unit disposed in the branch connection portion and including a valve stem actuable to open the valve unit, the method comprising using a separate pressure gauge assembly individually assigned to tank service personnel and adapted to be carried by said personnel for testing the pressure in the propane tank, the pressure gauge assembly including a pressure gauge; a valve assembly connector including means for actuating the valve unit when the valve assembly connector is connected to the valve assembly, and the testing of pressure comprising connecting the valve assembly connector of the pressure gauge assembly to the branch connection portion of the valve and connector assembly to actuate the valve unit and thus provide an immediate reading of the tank pressure by said gauge, using the reading of tank pressure in determining whether the tank is out of propane gas, and thereafter taking one or the other of the following two steps depending on the determining step: if the tank is determined to not be out of propane gas, introducing gas into the tank as needed; and if the tank is determined to be out of propane gas, turning the tank service valve off, pressurizing the tank, turning the service valve on, introducing gas into the system to pressurize the system, thereafter turning the tank service valve back off again so as to isolate the gas introduced into the tank, and reading the gauge pressure to determine whether gas is escaping from the propane tank system.

Preferably, the valve and connector assembly includes a main connection portion between the first and second end connections, an outlet hole is drilled into the main connector portion at an intermediate location therealong, and the valve unit comprises a saddle valve affixed to the main connector portion over the outlet hole.

In accordance with another embodiment of the invention, there is provided, for use in an output system of a liquid propane tank including a tank service tank valve and at least one regulator, a valve assembly for connection in the output system to enable pressure measurements to be made in the output system, the valve assembly comprising: a valve housing having a longitudinally extending bore therein, a valve unit received in the bore in said housing and including a valve seat and an elongate valve operator including a first, actuator end, a second, opposite end and a valve member disposed at the second end and being normally seated on the valve seat to close the valve unit, the valve operator being movable longitudinally in response to a force exerted on the actuator end thereof to unseat the valve member from the valve seat so as to provide opening of the valve unit, the valve housing including a threaded end located opposite to the actuator end of the valve operator for enabling the valve assembly to be screwed into a pressure port in the output system, the threaded end of said housing including an inlet opening in communication with the bore in said valve housing and the inlet opening having a diameter of no greater than 0.054 inches, for restricting fluid flow into said valve assembly.

In one preferred embodiment, the bore comprises a blind hole in the housing having a closed end, and the inlet opening comprises a drilled hole in the threaded end of the housing in communication with the closed end of the blind hole.

In an alternative implementation, the threaded end of the housing includes an end member affixed to the threaded end so as to close off the bore in the housing, and the inlet opening comprises a central aperture in said end member.

According to a further aspect of this embodiment of the invention, a kit is provided for use in a propane tank system for enabling detection of escaping gas by tank repair personnel, the tank system including a propane tank, a tank service valve connected to the tank, and at least one regulator connected to the tank service valve, as well as at least one pressure port for enabling pressure in the system to be measured at the location of the port, the kit comprising:

a valve assembly for connection, in use, to a selected pressure port in the tank system, the valve assembly comprising: a valve housing including a central bore therein and a threaded end connection for providing connection of the valve housing to the pressure port, the central bore including a first portion, and a further portion of a diameter smaller than the remainder of the bore and disposed, in use, adjacent to the pressure port so as to provide restricted fluid flow between the pressure port and the first portion of the central bore; and a valve unit received in the central bore of the valve housing and including a valve operator actuable to open a fluid connection to the pressure port when the valve assembly is connected to the pressure port; and a separate pressure gauge adapted to be carried by tank repair personnel and including a connector for providing connection of the pressure gauge to the valve assembly when said valve assembly is connected to the pressure port, and for, when connected to the valve assembly, providing actuation of the valve operator so that, in use with the tank service valve open, the gauge provides a reading of the pressure at the pressure port and, in use with the system pressurized and the tank service valve closed, the gauge provides an indication of the presence of a leak or open line in the propane tank system.

In an advantageous implementation of this aspect of this embodiment, the gauge comprises an indicating needle and further includes a pressure scale, and an ambient temperature scale calibrated relative to said pressure scale so that the position of the needle that provides a reading of gauge pressure on the pressure scale also provides a reading of the corresponding minimum ambient temperature on the ambient temperature scale.

Preferably, the bore comprises a blind hole in said housing having a closed end, and the inlet opening comprises a drilled hole in said threaded end of the housing in communication with the closed end of the blind hole. The drilled hole preferably has a diameter of no greater than 0.054 inches.

In accordance with another aspect of this embodiment of the invention, a method is provided for use by propane tank service personnel in detecting escaping gas in a propane tank system including a propane tank, a tank service valve and at least one regulator connected to the tank, and at least one pressure port located in the system for enabling a pressure measurement to be made of the pressure at the port, the method comprising:

installing, at the selected pressure port, a valve assembly comprising a valve housing including a restricted opening in an end thereof adapted to be screwed into the pressure port and a valve unit received in a bore in said valve housing in communication with said restricted opening and including a valve operator having an actuator end located at the other end of said valve housing; and using a separate pressure gauge, individually assigned to tank service personnel and adapted to be carried by said personnel, to provide measuring of the pressure at the port, said pressure gauge including a connector including means for actuating the valve operator of the valve unit when the connector is connected to the valve assembly, and said measuring of pressure comprising connecting the connector of the pressure gauge to the valve assembly to actuate the valve unit and thus to provide a reading of the pressure at the pressure port by the gauge, and, where gas has been introduced into the system to pressurize the system, and the tank has been turned off so as to isolate gas introduced into the tank, to provide a determination of whether gas is escaping from the propane tank system.

In an implementation of this method wherein the pressure port is located at the low pressure end of the system, the pressure gauge comprises a low pressure gauge or manometer, and the connector comprises an adapter connected to the valve assembly and including said means for actuating the valve unit, a hose connector connected to the adapter and a hose connected between the hose connector and the low pressure gauge or manometer.

In an implementation of this method wherein the pressure port is located at a point in the system wherein measurement of the port pressure is a measurement of the tank pressure, the measurement of port pressure is used in determining whether the tank is out of propane gas in the manner described above.

As in other implementations, the restricted opening preferably has a diameter of no greater than 0.054 inches. Also, preferably, the bore comprises a blind hole in the housing having a closed end, and the inlet opening comprises a drilled hole in the threaded end of the housing in communication with the closed end of said blind hole.

In accordance with a further preferred implementation of the method of this embodiment, a method is provided for use by propane tank service personnel in detecting escaping gas in a propane tank system including a propane tank, a tank service valve and at least one regulator connected to the tank, and at least one pressure port located in the system at a point wherein a pressure measurement made at that point is a measurement of tank pressure, the method comprising:

installing at the pressure port a valve assembly comprising a valve housing including a restricted opening in a threaded end thereof adapted to be screwed into the pressure port and valve unit received in a bore in the valve housing in communication with the restricted opening and including valve operator having an actuator end located at the other end of the housing, and using a separate pressure gauge assembly, individually assigned to tank service personnel and adapted to be carried by said personnel, for testing the pressure in the propane tank, said pressure gauge assembly comprising a pressure gauge and a connector including means for actuating the valve operator of the valve unit when the connector is connected to the valve assembly, and said testing of pressure comprising connecting the connector of the pressure gauge assembly to the valve assembly to actuate the valve unit and thus provide an immediate reading of the tank pressure by the pressure gauge, using the reading of tank pressure in determining whether the tank is out of propane gas, and thereafter taking one or the other of the following two steps depending on the determining step: if the tank is determined to not be out of propane gas, introducing gas into the tank as needed; and if the tank is determined to be out of propane gas, turning the tank service valve off, pressurizing the tank, turning the service valve on, introducing gas into the system to pressurize the system, thereafter turning the tank service valve back off again so as to isolate the gas introduced into the tank, and reading the gauge pressure indicated by said gauge to determine whether gas is escaping from the propane tank system.

Again, the restricted opening preferably has a diameter of no greater than 0.054 inches, and, preferably, the bore comprises a blind hole in the housing having a closed end, and the inlet opening comprises a drilled hole in the threaded end of the housing in communication with the closed end of the blind hole.

According to a still further aspect of this embodiment of the invention, there is provided a method of manufacturing a valve assembly for connection in an output system of a liquid propane tank including a tank service valve and at least one regulator, said valve assembly comprising: a valve housing having a longitudinally extending bore therein, a valve unit received in the bore in said housing and including a valve seat and an elongate valve operator including a first, actuator end, a second, opposite end and a valve member disposed at the second end and being normally seated on the valve seat to close the valve unit, the valve operator being movable longitudinally in response to a force exerted on the actuator end thereon to unseat the valve member from the valve seat so as to provide opening of the valve unit, the valve housing including a threaded end located opposite to the actuator end of the valve operator for enabling the valve assembly to be screwed into a pressure port in the output system of the tank, the bore in the housing comprising a blind hole defining a closed end of the housing, the method comprising: drilling an inlet opening having a diameter of no greater than 0.054 inches into the closed end of the valve housing to provide communication with the bore in the housing, cleaning out any drilling debris in the bore resulting from the drilling, and thereafter mounting the valve unit in the bore to complete the valve assembly.

Other features and advantages of the invention will be set forth in, or apparent from, the following detailed description of the preferred embodiment of the invention.

BRIEF DESCRIPTION OF THE DRAWINGS

FIG. 6 is an exploded front elevational view of a further embodiment of the kit of FIG. 1;

FIG. 7 is an exploded front elevational view of still another embodiment of the kit of FIG. 1;

DESCRIPTION OF THE PREFERRED EMBODIMENTS

Figure 1:
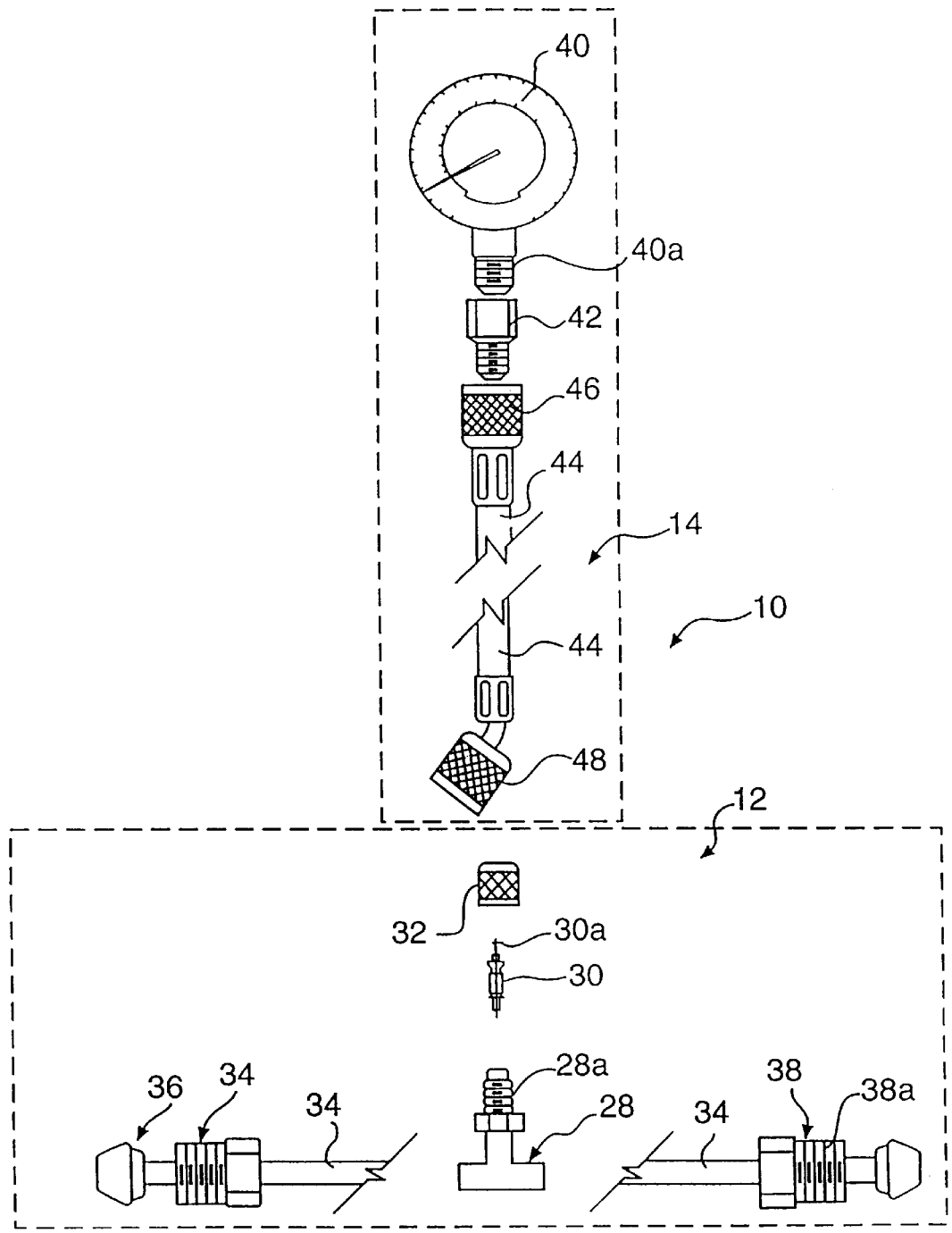
FIG. 1 is an exploded front elevational view of a pressure testing kit or assembly constructed in accordance with a preferred embodiment of the invention.

Referring to FIG. 1, there is shown an exploded front elevational view of the propane tank leakage detection kit or assembly of the invention. The overall assembly, which is generally denoted 10, basically comprises a valve assembly 12 which is adapted to be installed on the tank and a pressure gauge assembly 14 is carried by repair or service personnel and, as explained in more detail below, is adapted to be connected in line in the tank system and used in cooperation with valve assembly 12 to provide an indication or measurement of the gas pressure within the tank.

Figure 3:
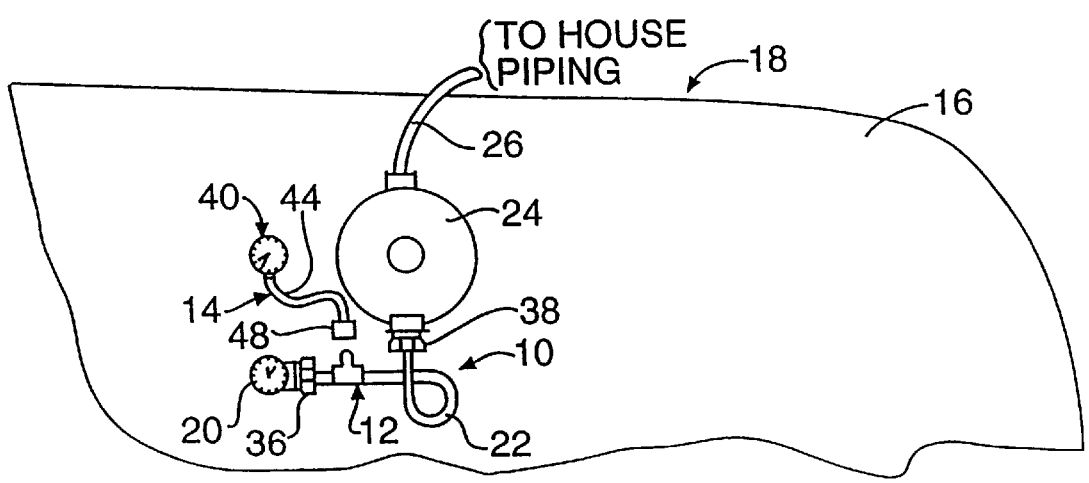
FIG. 3 is a front elevational view of the gauge of FIG. 1.

Before considering the two assemblies 12 and 14 in more detail, reference is made to FIG. 3 which shows the assembly 10 about to be used to measure the pressure with a propane tank 16 of a propane tank system generally denoted 18. The propane tank system 18 includes a tank valve 20 located at the top of tank 16 generally centrally thereof, a flexible "pigtail" connector 22 which connects tank valve 20 to a regulator 24 and an outlet connector 26 which connects regulator 24 to the house piping, i.e., the piping into the house at which the tank system 18 is used.

It will be understood that tank valve 20, regulator 24 and connector 26 are conventional, and that a conventional system would include a connection, typically in the form of a pigtail connector, between the tank valve 20 and regulator 24. However, in accordance with one preferred embodiment of the present invention, the conventional connection between valve 20 and regulator 24 is replaced by a connector 22 which is constituted by or incorporates a valve assembly 12 corresponding to that shown in FIG. 1 and which cooperates with a pressure gauge assembly 14 which is shown in FIG. 2 and which also corresponds to that shown in FIG. 1.

Referring again to FIG. 1, valve assembly 12 includes a tee connector 28 which includes a central branch forming a male flare connection 28a adapted to receive therein a valve unit or valve 30. Valve 30 is preferably a conventional Schrader valve such as the valves which are conventionally used in refrigeration systems. Such a valve is described in, for example, in U.S. Pat. No. 4,338,793 to O'Hern, Jr. referred to above. The valve 30 includes a valve stem or operator 30a which controls opening and closing of the valve 30 in a conventional manner. A knurled valve cap 32 fits over the male connection 28a when the valve is not connected to gauge assembly 14. The base of tee connector 28 is lifted in line into a flexible connector 34 so that, with valve 30 closed, a direct or through connection is provided thereby between tank valve 20 and regulator 24. At opposite ends of flexible connector 34 are conventional end connections 36 and 38 including male unions 36a and 38a. It is to be understood that apart form connection therein of a valve unit therein the flexible connection 34 and end connections 36 and 38 are entirely conventional and themselves form no part of the invention. The elements are considered to be part of valve assembly 12 because, in accordance with a preferred embodiment of the invention, the entire existing standard or conventional connection between tank valve 20 and regulator 24 is replaced by valve assembly 22 rather than inserting a valve unit in the existing connection. Further, the end connections 36 and 38 (and particularly the latter) can take different forms depending on the nature of the existing connection in the propane system.

Turning now to the gauge assembly 14 (FIG. 3), this assembly includes a gauge 40 with a main connector 40a, an intermediate connector element 42, and a hose 44 with a first female flare union 46 at the end thereof proximate to gauge 40 and a second female flare union 48 at the opposite end thereof. Union 48 includes an actuator pin or member (not specifically shown) which provides actuation of valve stem 30a and thus opening of valve unit 30 when union 48 is screwed on the male flare connection 28a of tee connector 28.

Figure 2:
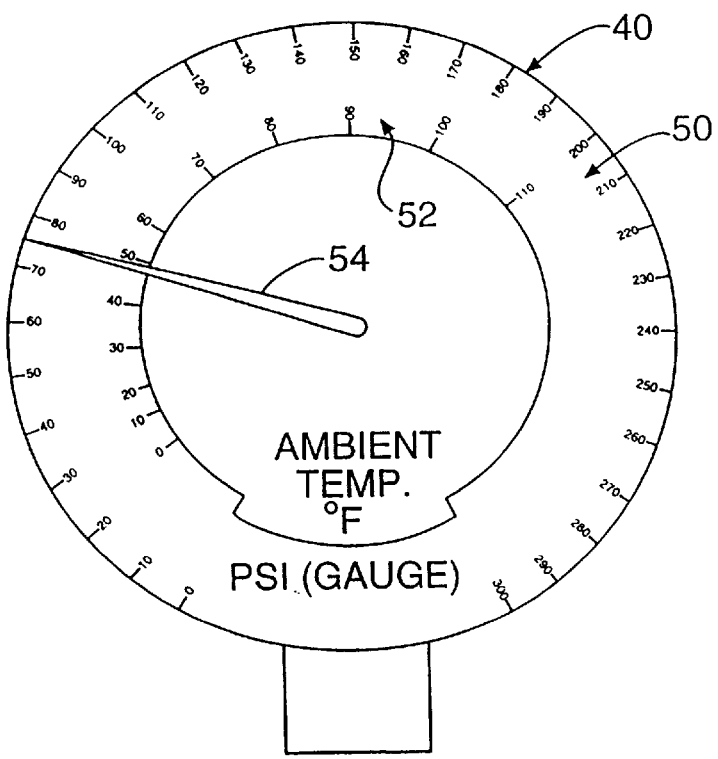
FIG. 2 is a front elevational view of the gauge of FIG. 1.

The face of gauge 40 is shown in more detail in FIG. 2. Gauge 40 is a pressure gauge and in the illustrated embodiment, a measurement band or scale 50 provided around the outer periphery of the gauge indicates the measured gauge pressure in pounds per square inch, while an inner, concentric, part-circular measurement band or scale 52 provides an indication of the corresponding ambient temperature in degrees F. In the latter regard, the temperature scale 52 is calibrated to provide an indication of the minimum ambient temperature for the corresponding pressure reading so that, as shown, for a measurement of 40 psi gauge the ambient (or outside surrounding) temperature should be no higher than about 20° F. while for measurement of 50 psi gauge the ambient temperature should not be higher than roughly about 52° F. These pressure-temperature relationships have been previously determined for propane tanks and by incorporating the relationships into gauge 40, a repairman, knowing the ambient temperature, is provided with a direct indication as to whether the tank 16 may be out of fluid. Thus, considering the position of the needle 54 of gauge 40 shown in FIG. 2, the ambient temperature corresponding to the pressure reading (of about 75 psi) is about 48° F. so that the actual ambient temperature is higher, the tank 18 is possibly out of liquid.

It is to be understood that the indication provided by gauge 40 essentially concerns the rate of vaporization of the liquid so that when the ambient temperature reading corresponding to the gauge pressure is lower than the actual ambient temperature, an indication is provided that the vaporization rate in the tank 16 is insufficient. It will be appreciated that there can be more than one cause for this so that the tank may not actually be empty. For example, the situation may be one wherein the liquid in the tank is being used at a very high rate when the pressure measurement is made or one where the tank is too small and a larger tank is thus required. In any event, the pressure measurement and the corresponding calibrated value of the ambient temperature as compared with the actual temperature alert the repairman to a possible problem, including the possibility that the tank is empty.

Considering the overall operation of the assembly 10 of FIGS. 1 to 3, to install the valve assembly 12, the repairman simply replaces the existing, typically flexible connection between tank valve 20 and regulator 24 with valve assembly 12. With the valve assembly in place, to make a pressure measurement, cap 32 is removed from tee section 28 and the end connector or hose 44 is screwed onto tee section 28 so as to actuate valve 30 and open a path to gauge 40. A reading is then taken to determine whether the tank is out of liquid. As discussed above, even if a pressure reading is obtained, the repairman will be alerted to the possibility that the tank is out of liquid if the corresponding calibrated ambient temperature reading on scale 52 is less than the actual ambient temperature. Assuming that some filling of the tank 16 is required, the tank is pressurized and the tank valve 20 is closed. At this point, gauge 40 is checked again to determine whether there is a leak. If gauge 40 provides a steady reading, there is no leak downstream thereof. On the other hand, if there is a significant fall in pressure and, in particular a fall in pressure within the limits of sections 54 and 58 of the NFPA Pamphlet referred to above, it can be safely assumed that there is a leak in the system or an open appliance valve. The gas supply valve should then be left off, the customer notified and repairs made, as required.

Although the use of the gauge shown in FIG. 1 is generally preferred because of the ease of reading thereof, such a gauge may not be necessary in locations such as the sub-tropics where the temperature remains substantially constant during the work day and thus a conventional pressure gauge would be suitable. Further, although this would be more cumbersome, a chart or table showing vapor pressure of propane, such as that set forth below, can be used in combination with a conventional pressure gauge to relate temperature and pressure.

TABLE 1

VAPOR PRESSURES OF PROPANE

| 130° F. | 257 psig | 20° F. | 40 psig |
|---|---|---|---|
| 120° F. | 225 psig | 10° F. | 31 psig |
| 110° F. | 197 psig | 0° F. | 23 psig |
| 100° F. | 172 psig | −5° F. | 20 psig |
| 90° F. | 149 psig | −10° F. | 16 psig |
| 80° F. | 128 psig | −15° F. | 13 psig |
| 70° F. | 109 psig | −20° F. | 10 psig |
| 65° F. | 100 psig | −25° F. | 8 psig |
| 60° F. | 92 psig | −30° F. | 5 psig |
| 50° F. | 77 psig | −35° F. | 3 psig |
| 40° F. | 63 psig | −40° F. | 1 psig |
| 30° F. | 51 psig | −44° F. | 0 psig |

Figure 4:
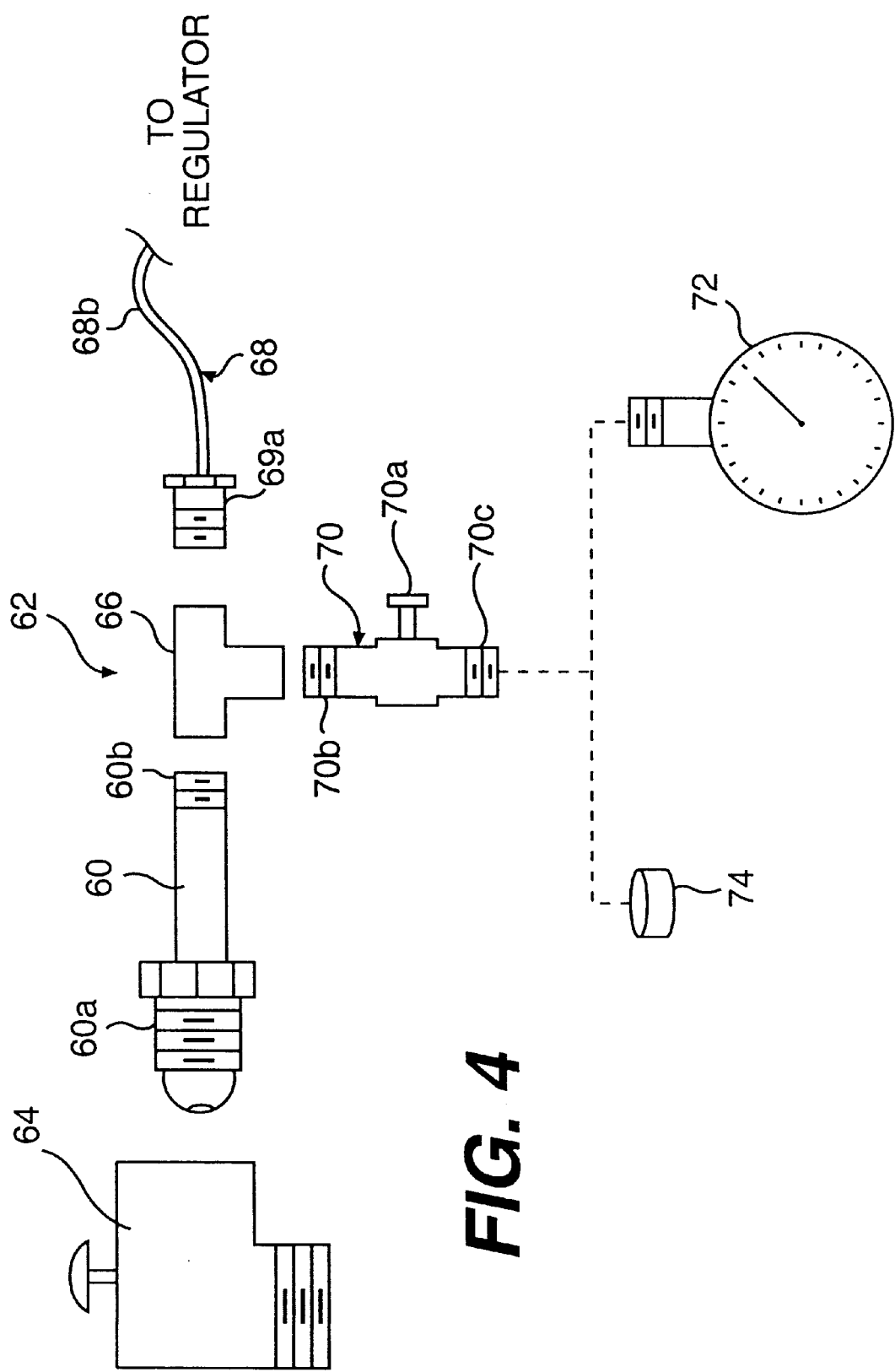
FIG. 4 is an exploded front elevational view of another embodiment of the kit of FIG. 1.

Referring to FIG. 4, a first alternative embodiment of the invention is shown. In this embodiment, a straight pipe brass connector 60 is used to connect the overall valve and connector assembly 62 to the a conventional tank valve, indicated at 64. Connector 60 includes conventional left-hand threading 60a for making this connection. The threading 60b at the other end of connector 60 is used to make a connection with the main body of a one piece female tee connector 66.

The other end of the main body of tee connector 66 is adapted to be connected to the threaded end 68a of a pigtail connector 68 which includes a pigtail portion 68a and which connects to the regulator (not shown in FIG. 4).

In this embodiment, a needle valve unit 70, including a valve control member 70a and male threads 70b and 70c at opposite ends thereof, is connected to the branch connector portion of tee connector 66. The valve control member 70 controls opening and closing of the associated valve of valve unit 70, i.e., this is not effected automatically as in the previous embodiment.

A pressure gauge 72 is screwed onto valve unit 70 when a pressure measurement is to be made whereas a cap 74 can be screwed onto valve unit 70 at other times. As set forth above, pressure gauge 72 can be a pressure gauge such as that shown in FIG. 3 or can be a conventional (e.g., 300 psig) pressure gauge for use with a chart or table which corresponds to Table 1 above relating temperature and vapor pressure and which would be adapted to be carried by the service personnel.

Figure 5:
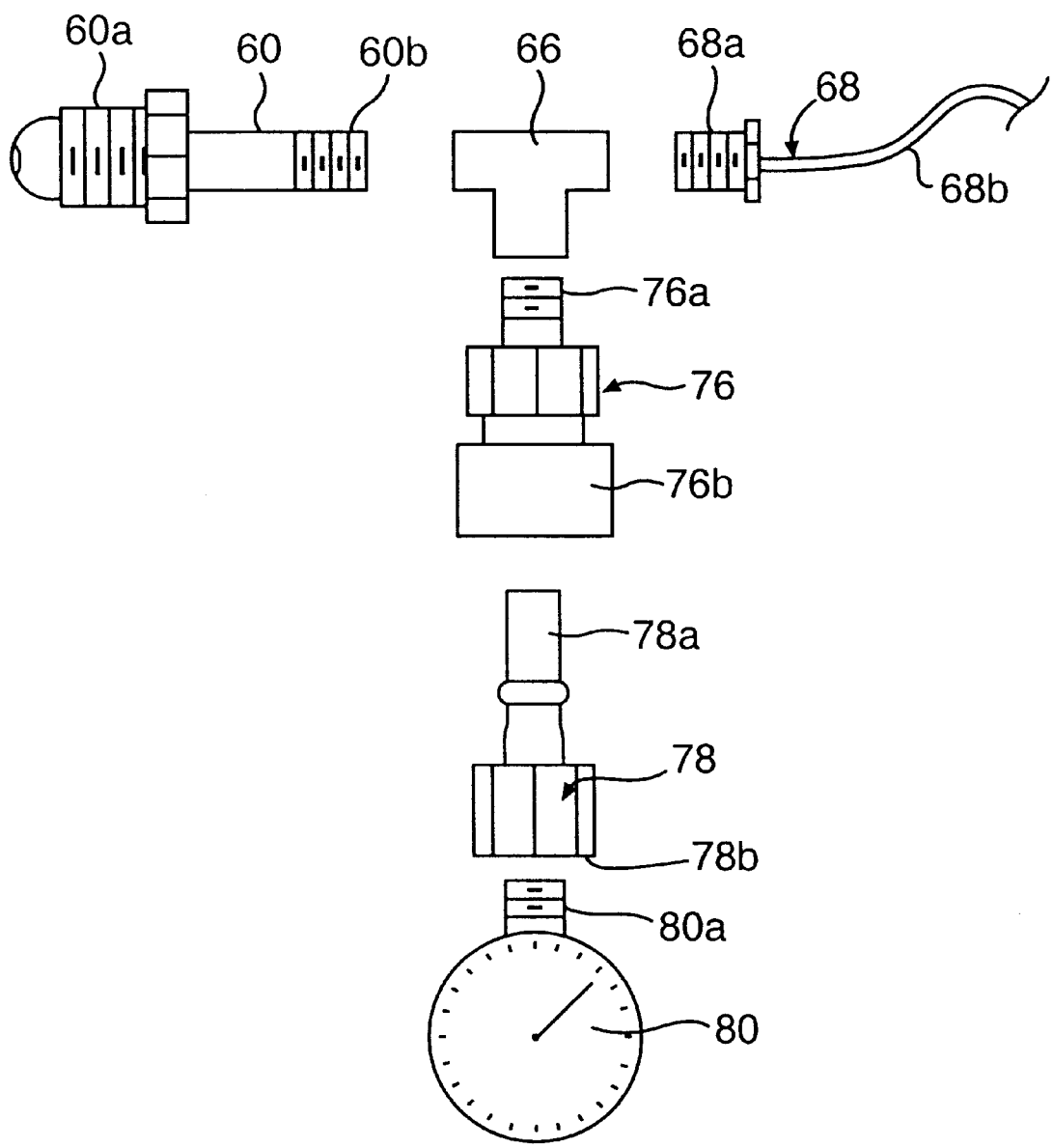
FIG. 5 is an exploded front elevational view of yet another embodiment of the kit of FIG. 1.

Referring to FIG. 5, a further embodiment of the invention is shown. This embodiment uses a number of components in common with the embodiment of FIG. 4 and these components, viz., the straight pipe connector 60, the tee connector 66 and the pigtail connector 68, have been given the same reference numerals. This embodiment differs from that of FIG. 4 in that the tee section also includes a female, liquid petroleum approved, quick coupling valve unit 76 which is adapted to be screwed by means of threading 76a onto the branch connection portion of tee connector 66. Valve unit 76 is essentially conventional and includes an associated valve (not shown in FIG. 5) which is actuated when a male connector element 78a of a conventional male quick coupling unit 78 is inserted into the female receptacle 76a of coupling unit 76. Screw threadings 78b enable male unit 78 to be connected to complementary threadings 80a of a pressure gauge 80 which, again, can be the gauge of FIG. 3 or a more conventional gauge. Thus, a gauge reading can be provided by coupling male unit 78 with the associated gauge 80 screwed thereon, to the female valve unit 76 in the general manner of the embodiment of FIG. 1.

Turning to FIG. 6, yet another embodiment of the invention is shown. In this embodiment, the connector portion of the valve and connector assembly comprises connector element 82, which is similar to the connector element of the straight pipe connectors 60 of FIGS. 4 and 5 and which includes corresponding threading 82a for connection to the tank valve (not shown in FIG. 6), and a pigtail connector 84, which is connected at its free end to the regulator (not shown). Further, instead of providing a separate tee connector as such, a tee or branch connection is provided by welding a Schrader valve unit 86 to the pigtail connector section 84. The core of the Schrader valve of unit 86 is indicated at 88 and valve unit 88 includes a conventional free end connector 88a adapted to be received in a swivel nut 90 with a depressing stem (not shown) for actuating the Schrader valve. A flange adapter 92, affixed to swivel nut 90, enables connection to a gauge 94 which, again, can be either of the two basic types discussed above.

Referring to FIG. 7, still another embodiment of the invention is shown. This embodiment differs from those discussed above in that a direct hookup or connection to the regulator is provided and is particularly useful with systems employing liquid petroleum cylinders or bottles. A brass straight pipe connector 96 with conventional left-handed threading 96a for connection to the tank valve (not shown in FIG. 7) also includes suitable threading 96b at the other end of the straight pipe section 96c of connector 96 for providing the direct connection to the cylinder regulator (not shown). Similarly to the embodiment of FIG. 6, a Schrader valve unit 98 is welded to the straight pipe section 96c and includes a valve core 100, and a swivel nut 102 for actuating the Schrader valve is also provided. A flexible hose 104 connects nut 102 to a second female swivel nut 106 which differs from swivel nut 102 in that nut 106 does not include an actuating stem. A further connector 108, including a male flare 108a and a female adapter 108b, is used to connect hose 106 to a suitable gauge 110.

Figure 8:
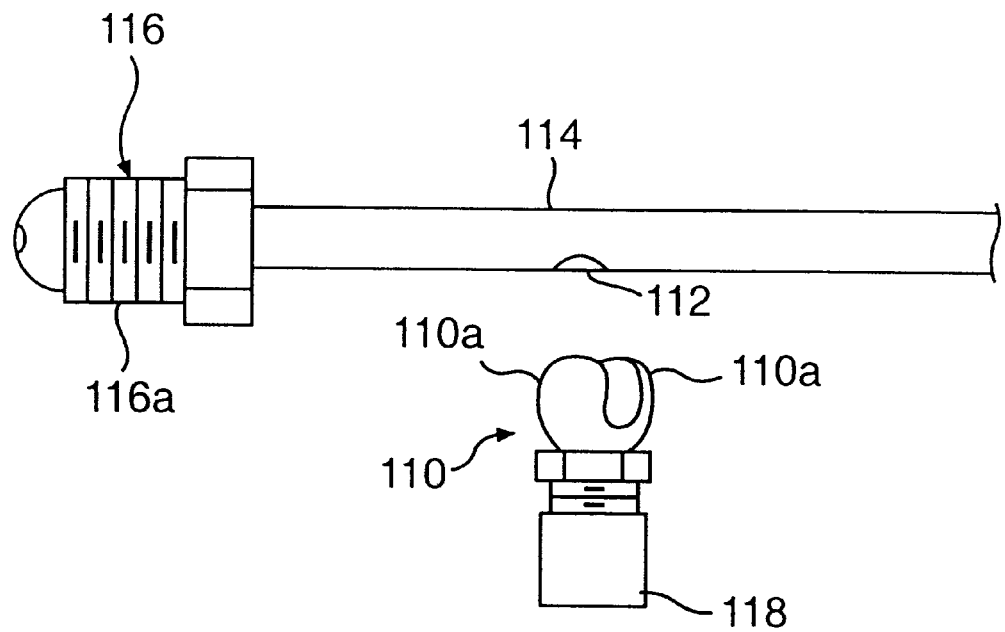
FIG. 8 is an exploded front elevational view of yet another embodiment of a part of the kit of FIG. 1.
Figure 9:
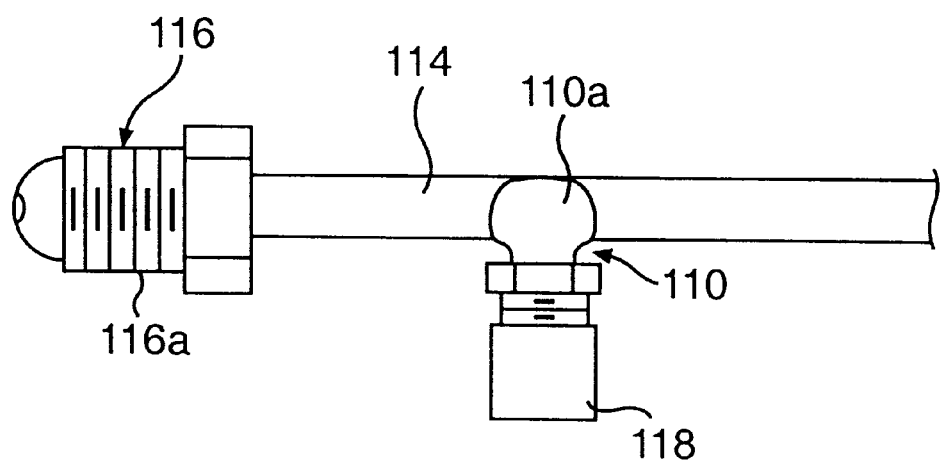
FIG. 9 is a front elevational view of the embodiment of FIG. 8, as assembled.

Referring to FIGS. 8 and 9, there is shown yet another embodiment of the invention. This embodiment is similar to that of FIGS. 6 and 7 in that a valve connection is again made directly to the pipe connection to the tank valve (rather than using a tee connector), but in this embodiment a "saddle" valve unit, indicated at 110, is used to make the direct connection. As shown in FIG. 8, a hole 112 is provided, e.g., by drilling, in a pipe connector 114. The latter may be a straight connector or a pigtail connector and includes an end connector 116 with conventional left hand threading 116a. In a specific exemplary implementation, connector 114 is either ¼" or ⅜" by 12" copper pigtail tube.

The legs 110a of saddle valve unit 110, which are skewed in FIG. 8 for purposes of illustration, fit around connector 114 and the saddle valve unit 110 is soldered or welded directly onto connector 114 over the drilled hole 112. A knurled end cap or valve cap 118, generally corresponding to end cap 32, is connected to the free end of valve unit 110.

An advantage of the embodiment of FIGS. 8 and 9 over those of FIGS. 6 and 7 is that a stronger connection is provided between the valve assembly and the connector piping. Valve unit 110 preferably incorporates a Schrader valve but can employ another type of valve as discussed above. It will be understood that a meter or gauge would also be part of the overall kit or assembly and would, in use, be connected to the valve 110 after the cap 118 was removed, as described above in connection with the other embodiments.

Figure 10:
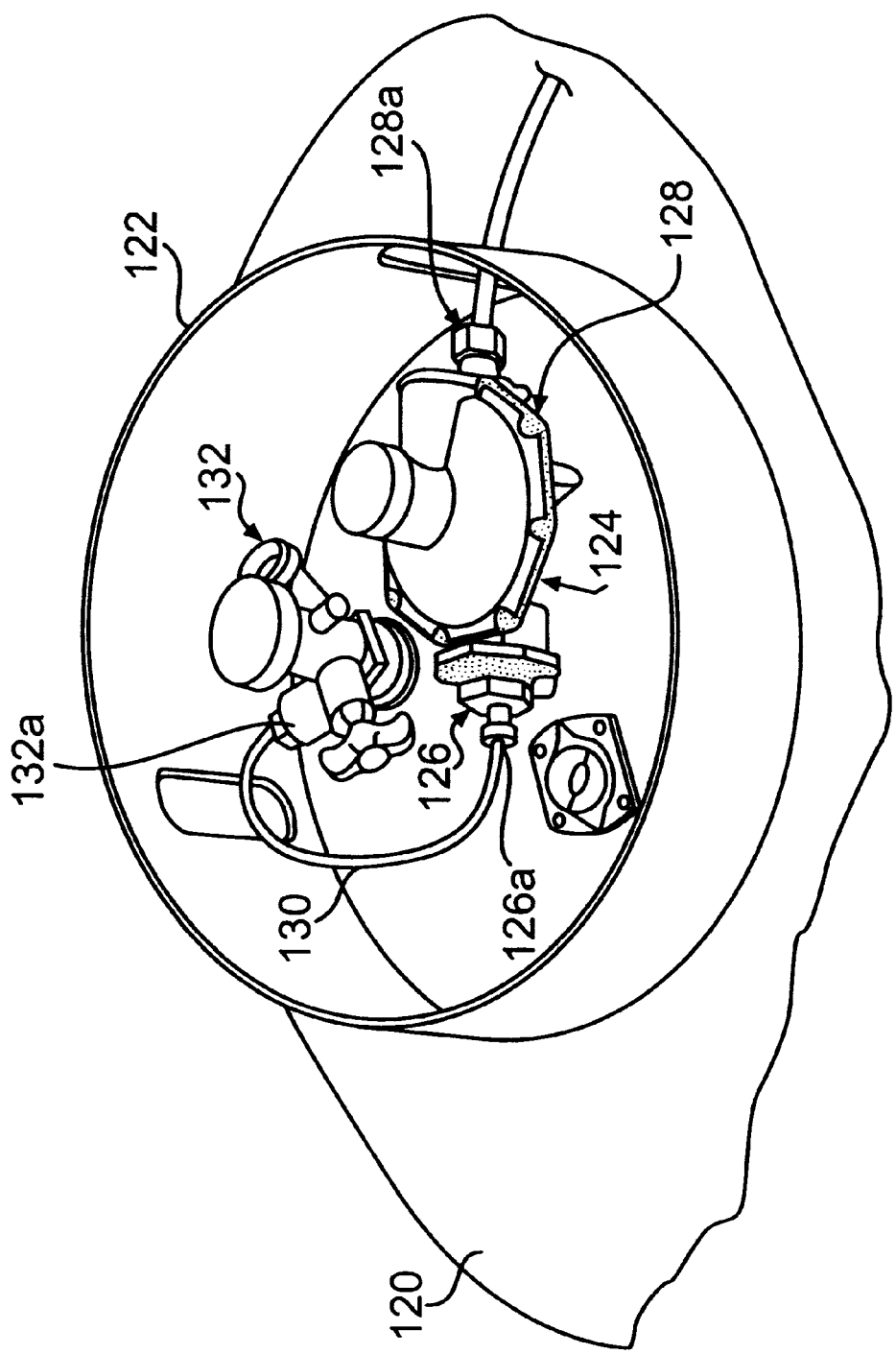
FIG. 10 is a perspective view of a conventional tank regulator system used in explanation of yet a further embodiment of the invention.

Before turning to consideration of a further embodiment of the valve assembly of the invention, some background considerations will be addressed in order to provide a better understanding of the various applications of this embodiment. Referring to FIG. 10, there is shown a top portion of an LP cylinder including a conventional two stage regulator arrangement. The arrangement shown is generally similar to the single stage regulator arrangement of FIG. 2 and is of the type made by Sherwood LP Products, Series 920 and 921, which combines first stage and second stage regulation in one unit. It is to be understood that this embodiment of the invention is applicable to arrangements including both two stage and single stage regulators as well as to other different arrangements.

In FIG. 10, the LP cylinder is denoted 120 and includes an upper protective ring element or annulus 122 which houses, i.e., surrounds, a two stage regulator 124 comprising a first stage 126 and a second stage 128. The second stage 128 includes a low pressure connection 128a which is connected to the service line 128. The first stage regulator 126 includes a high pressure connection 126a which is connected through a standard pigtail connection 130 to the downstream outlet 132a of a tank service valve 132.

Figure 11:
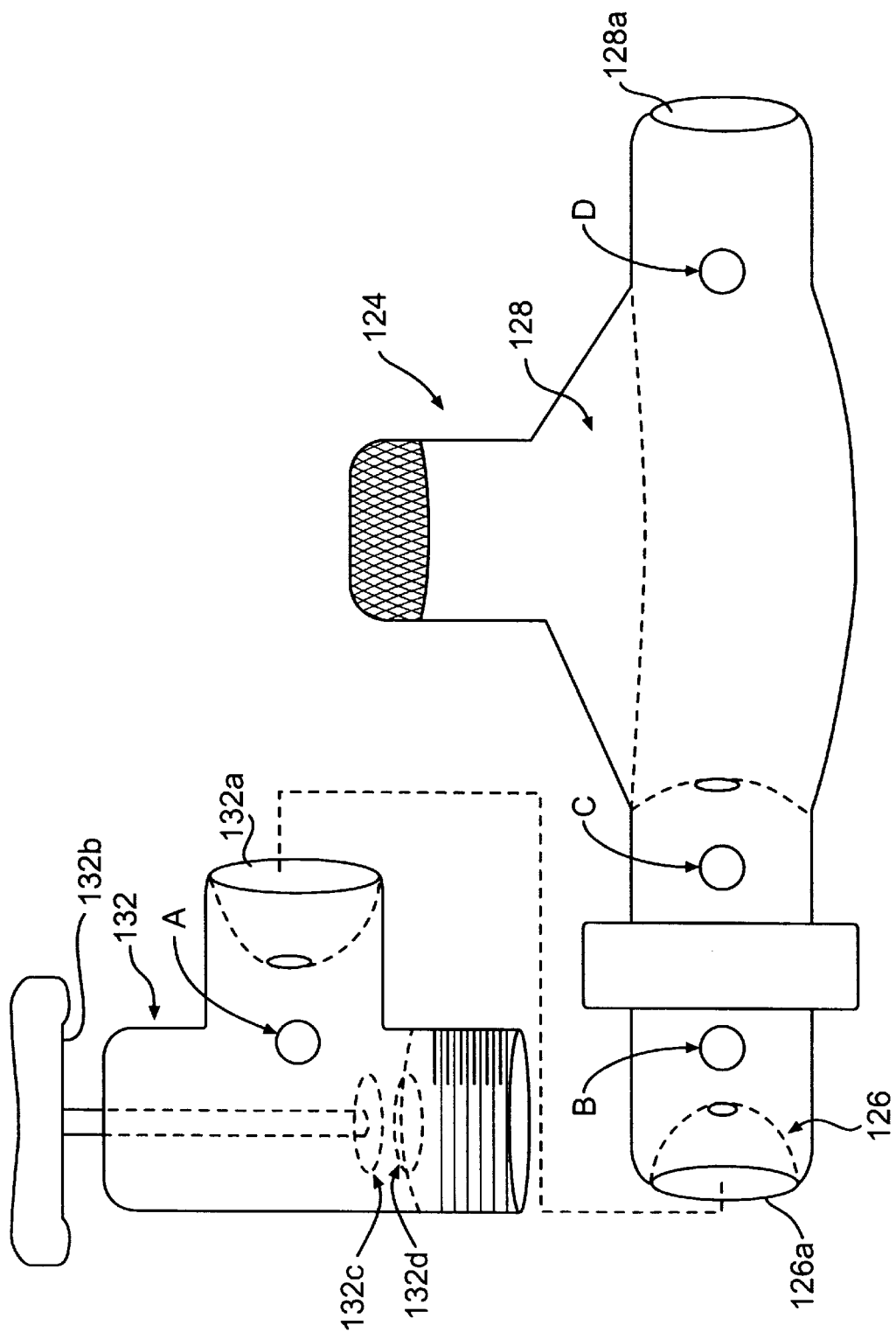
FIG. 11 is a schematic side elevational view of the tank regulator system of FIG. 10, illustrating different pressure ports or taps.

The two stage regulator 124 and the tank service valve 132 are also shown in schematic form in FIG. 11. In FIG. 11, the tank service valve 132 is shown as including a valve operator 132b for controlling movement of a valve element 132c relative to a valve seat 132d. FIG. 11 shows, in a schematic manner, a series of pressure ports A, B, C and D at various places in the system, and will be described in more detail below relative to the embodiment of the valve assembly of the invention shown in FIGS. 12 and 13. However, it will be appreciated that the basic overall arrangements shown in FIGS. 10 and 11 are completely conventional, and thus further description thereof will be omitted.

Figure 12:
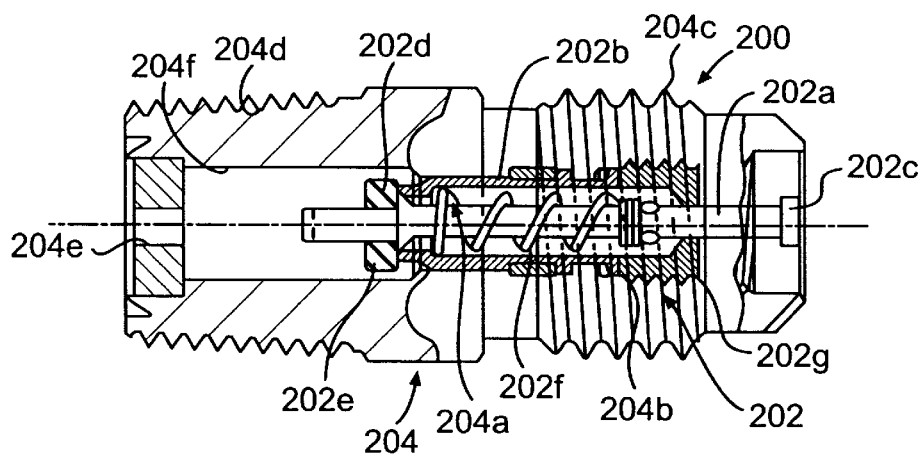
FIG. 12 is a longitudinal cross sectional view of a valve assembly in accordance with a first preferred embodiment of the aforementioned embodiment.

Referring to FIG. 12, a first implementation of this further embodiment of the valve assembly of the invention is shown. The valve assembly, which is generally denoted 200, basically comprises a valve unit 202 and a valve housing 204. The valve unit 202 is conventional and is a type manufactured by Schraeder-Bridgeport among others. Because of the conventional nature thereof, the valve unit 202 will be only briefly described. The valve unit 202 includes a longitudinal valve stem or valve operator 202a which is housed in a cylinder 202b and which extends outwardly from opposite ends thereof. The first, actuator end (i.e., the right end, as viewed in FIG. 12) includes an operator or actuator element 202c while the opposite end includes a valve member 202d which is adapted to seat against a valve seat 202e formed at the adjacent end of cylinder 202b. Valve operator 202a is biased by a coil spring 202f into the inoperative or closed state wherein valve member 202d seats on valve seat 202e. Inwardly directed pressure on valve operator element 202a causes compression of coil spring 202f and separation of valve member 202d from valve seat 202e so as to provide opening of valve unit 202. Cylinder 202b includes a threaded portion 2029 which screws into housing 204 to fix valve unit 202 within valve housing 204. Again, valve unit 202 is completely conventional and further description is not believed to be necessary.

Valve housing 204 is generally cylindrical in shape and includes an internal opening 204a having an internal threaded portion 204b which receives the corresponding external threaded portion 202g of cylinder 202b of valve unit 202. Housing 204 also includes two separate, spaced external threaded portions 204c and 204d. The former enables a protective end cap (not shown) to be screwed onto housing unit 204 while the after enables housing unit 204, and thus the valve unit 202 received therein, to be screwed into a suitable pressure port or outlet. Again, the part of valve housing unit 204 described so far is conventional and a housing unit of this type is also made by Schraeder-Bridgeport and others. Typically, the thread 204d of housing 204 is either ¼ or ⅛ inch male pipe thread.

Turning now to the present invention, according to this aspect of the invention, a reduced diameter aperture 204e is provided at the pressure tap side of housing unit 204. In this regard, in contrast to a conventional valve housing wherein the internal central bore or chamber 204f formed with one end disposed adjacent to valve member 202d and valve seat 202e is of uniform diameter throughout, valve housing 204 is formed or constructed with the aforesaid reduced diameter aperture 204e at the distal or pressure tap side of central bore 204f. The size of the opening or orifice 204e is that of a No. 54 orifice or smaller, i.e., 0.054 inches or smaller, thus making the valve assembly compatible with the standards and requirements in this field (which require that an opening be provided that allows a flow no greater than that of a No. 54 drill size, or else an excess flow check valve must be provided). In the embodiment of FIG. 12, the orifice 204e is provided in an end element 204g in the form of a planar disc which is swaged or pressed fit into the pressure tap end of housing 204 so that the orifice 204e provided in end element 204g provides a reduced diameter inlet to cylindrical chamber 204f of housing 204.

Figure 13:
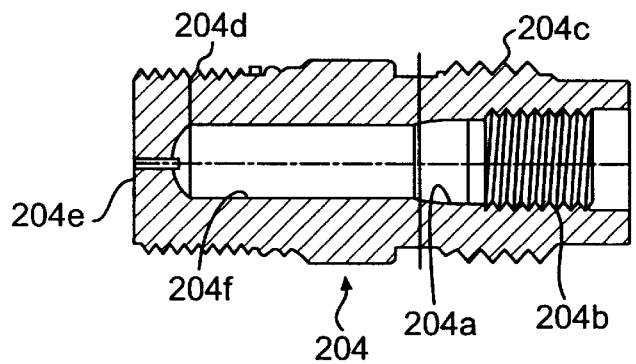
FIG. 13 is a longitudinal cross sectional view of a valve housing in accordance with a further, most preferred embodiment of the valve assembly of FIG. 12.

Referring to FIG. 13, a preferred implementation of this embodiment of the invention is shown. Only the valve housing is illustrated in FIG. 13 and corresponding elements have been given the same reference numerals. In the implementation illustrated in FIG. 13, cylindrical bore or chamber 204f is provided as a blind hole in housing 204 and orifice 204e is drilled into the center of the closed end portion of housing 204 to provide communication with chamber 204f.

This method of providing the reduced diameter orifice 204e has important advantages from a manufacturing standpoint. In this regard, a problem that has been encountered in providing the reduced diameter opening 204e in the valve assembly 200 is that brass filings produced during provision of such an opening can get into the associated valve seat and cause a leak or blockage. The present invention provides for drilling the opening 204e in the closed end of housing 204 and completely cleaning out the residue or debris before installing the LP-gas approved valve unit 202 with associated valve seat 202e, thereby eliminating any potential leakage problem. Providing an opening into a regulator or tank in any other way can have serious consequences in that a fire occurring around or near the tank can melt valve seats and regulator seats, thereby releasing tank pressure out of those seats. The close proximity of these openings to the tank valve makes it impossible as a practical matter to shut the tank valve off under these conditions and the egress of propane at this point will act like a cutting torch, burning through anything in its path, including the tank itself.

Turning again to FIG. 11, various applications of the valve assembly embodiments of FIGS. 12 and 13 will now be considered. Before referring to FIG. 11, it is noted that, in general, in contrast to other embodiments wherein the valve assembly is associated with a connector (pigtail), the valve assembly 200 can be simply screwed into various places in the system. As will be explained, this can be done both to provide the present tank pressure reading and leak test described above, and to provide testing of pressures on the downstream side of the high pressure regulator, while also providing a leak test at this point using the method described hereinbefore. However, the latter method, under most circumstances, will not provide an indication of whether there is liquid in the tank. The exception is where the ambient temperature is very low. In addition, the valve assembly 200 can be screwed into a tap at the low pressure side of a low pressure regulator and in cooperation with an "ounce" gauge or a water manometer, equipped with a proper adapter (such as described below in connection with FIG. 14), can be used to set the proper pressure output of the regulator and can also be used in the above-described manner as a leak detector without breaking into the system.

With this background, referring again to FIG. 11, a port A is indicated in tank service valve 132 into which valve assembly 200 can be screwed. Such a port is not now available on conventional tank service valves but could be included in future tank service valves. This port must be provided between the service valve seat 132d and the regulator connector port 132a in order for the testing methods described above in connection with the previous embodiments of the invention to be carried out.

A further port B is indicated on the upstream or tank pressure side of the regulator 124 and is provided in the first stage regulator 126 itself. Such a port is now available on some regulators. Connecting the valve assembly 200 at port B will also enable the full testing method or procedure described above to be carried out.

Port C of regulator 124 is now available on most regulators, including twin-stage ("piggy-back") regulators such as illustrated in FIGS. 10 and 11, and single high pressure regulators. Port C is provided in the regulated side of the high pressure or first stage regulator and will provide only regulated pressure readings. However, with valve assembly 200 installed and using a pressure gauge as described above, a downstream leak in the system can be detected when the tank service valve 132 is turned off. As indicated above, this measurement will not confirm the presence of liquid in the tank itself unless the ambient temperature and pressure is very low, i.e., below that at the output of the regulator.

Port D corresponds to a port normally provided on the low pressure side of twin-stage regulators (e.g., at the output of second stage regulator 128 of FIG. 11) and unitary low pressure or second stage regulators, and readings from this port cannot be made using the measuring methods or techniques previously described. However, with valve assembly 200 installed in port D, readings can be taken from port D using a very low pressure ("ounce") gauge or a water manometer, in order to set the pressure of the second stage regulator itself, and also to provide a low pressure leak test of the system Suitable adapters (including that shown in FIG. 14) can be provided to enable attachment of the gauge or manometer to the valve assembly 200, and to enable measurements to be made without breaking into the system, as is the case for all of the embodiments of the invention described above.

Figure 14:
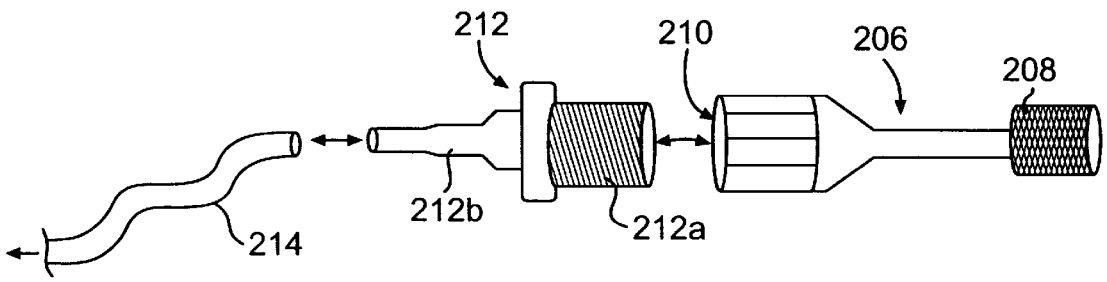
FIG. 14 is a side elevational view of an adapter arrangement useful in connection with one application of the valve assembly of FIGS. 12 and 13.

Referring to FIG. 14, there is shown an adapter of the type mentioned in the preceding paragraphs. The adapter, which is denoted 200, includes a female valve nut 208 (e.g., of the type made by Schraeder-Bridgeport) which includes a valve operating (depressing) stem (not shown) and which screws on the threads 204c of valve assembly 200 so as to actuate valve unit 202. The adapter 206 also includes a (female) connector 210 at the other end that screws onto the male threaded end 212a of a conventional hose connector 212. Hose connector 212 further includes a hose barb or connector 212b at the other end that connects to hose 214 adapted to be connected to a water manometer (not shown) or ounce gauge (not shown) as described above.

Although the present invention has been described to specific exemplary embodiments thereof, it will be understood by those skilled in the art that variations and modifications can be effected in these exemplary embodiments without departing from the scope and spirit of the invention.

What is claimed is:

1. A method for use by propane tank service personnel in detecting escaping gas in a propane tank system including a propane tank, a tank service valve and at least one regulator connected to the tank, and at least one pressure port located in the system for enabling a pressure measurement to be made of the pressure at the port, said method comprising:

installing, at the selected pressure port, a valve assembly comprising a valve housing including a restricted opening in an end thereof adapted to be screwed into the pressure port and a valve unit received in a bore in said valve housing in communication with said restricted opening and including a valve operator having an actuator end located at the other end of said valve housing; and using a separate pressure gauge, individually assigned to tank service personnel and adapted to be carried by said personnel, to provide measuring of the pressure at the port, said pressure gauge including a connector including means for actuating the valve operator of the valve unit when the connector is connected to the valve assembly, and said measuring of pressure comprising connecting the connector of the pressure gauge to the valve assembly to actuate the valve unit and thus to provide a reading of the pressure at the pressure port by the gauge, and, where gas has been introduced into the system to pressurize the system, and the tank has been turned off so as to isolate gas introduced into the tank, to provide a determination of whether gas is escaping from the propane tank system.

2. A method according to claim 1 wherein the pressure port is located at the low pressure end of the system, wherein said pressure gauge comprises a low pressure gauge or manometer, and wherein said connector comprises an adapter connected to the valve assembly and including said means for actuating said valve unit, a hose connector connected to said adapter and a hose connected between the hose connector and the low pressure gauge or manometer.

3. A method according to claim 1 wherein said pressure port is located at a point in the system wherein measurement of the port pressure is a measurement of the tank pressure, and wherein said measurement of port pressure is used in determining whether the tank is out of propane gas.

4. A method according to claim 1 wherein said restricted opening has a diameter of no greater than 0.054 inches.

5. A method according to claim 1 wherein said bore comprises a blind hole in said housing having a closed end, and said inlet opening comprises a drilled hole in said threaded end of the housing in communication with said closed end of said blind hole.

6. A method according to claim 1 wherein said restricted opening has a diameter of no greater than 0.054 inches.

7. A method according to claim 1 wherein said bore comprises a blind hole in said housing having a closed end, and said inlet opening comprises a drilled hole in said threaded end of the housing in communication with said closed end of said blind hole.

8. A method for use by propane tank service personnel in detecting escaping gas in a propane tank system including a propane tank, a tank service valve and at least one regulator connected to the tank, and at least one pressure port located in the system at a point wherein a pressure measurement made at that point is a measurement of tank pressure, said method comprising:

installing at the pressure port a valve assembly comprising a valve housing including a restricted opening in a threaded end thereof adapted to be screwed into the pressure port and valve unit received in a bore in said valve housing in communication with said restricted opening and including valve operator having an actuator end located at the other end of the housing, and using a separate pressure gauge assembly, individually assigned to tank service personnel and adapted to be carried by said personnel, for testing the pressure in the propane tank, said pressure gauge assembly comprising a pressure gauge and a connector including means for actuating the valve operator of the valve unit when the connector is connected to the valve assembly, and said testing of pressure comprising connecting the connector of the pressure gauge assembly to the valve assembly to actuate the valve unit and thus provide an immediate reading of the tank pressure by the pressure gauge, using the reading of tank pressure in determining whether the tank is out of propane gas, and thereafter taking one or the other of the following two steps depending on the determining step: if the tank is determined to not be out of propane gas, introducing gas into the tank as needed; and if the tank is determined to be out of propane gas, turning the tank service valve off, pressurizing the tank, turning the service valve on, introducing gas into the system to pressurize the system, thereafter turning the tank service valve back off again so as to isolate the gas introduced into the tank, and reading the gauge pressure indicated by said gauge to determine whether gas is escaping from the propane tank system.

9. For use in an output system of a liquid propane tank including a tank service valve and at least one regulator, a valve assembly for connection in the output system to enable pressure measurements to be made in said output system, said valve assembly comprising: a valve housing having a longitudinally extending bore therein, a valve unit received in said bore in said housing and including a valve seat and an elongate valve operator including a first, actuator end, a second, opposite end and a valve member disposed at said second end and being normally seated on said valve seat to close the valve unit, said valve operator being movable longitudinally in response to a force exerted on the actuator end thereof to unseat the valve member from said valve seat so as to provide opening of the valve unit, said valve housing including a threaded end located opposite to the actuator end of said valve operator for enabling the valve assembly to be screwed into a pressure port in said output system, said threaded end of said housing including an inlet opening in communication with said bore in said valve housing and said inlet opening having a diameter of no greater than 0.054 inches, for restricting fluid flow into said valve assembly.

10. A valve assembly according to claim 9 wherein said bore comprises a blind hole in said housing having a closed end, and said inlet opening comprises a drilled hole in said threaded end of the housing in communication with said closed end of said blind hole.

11. A assembly according to claim 9 wherein said threaded end of said housing includes an end member affixed to said threaded end so as to close off the bore in the housing, and said inlet opening comprises a central aperture in said end member.

12. A kit for use in a propane tank system for enabling detection of escaping gas by tank repair personnel, the tank system including a propane tank, a tank service valve connected to the tank, and at least one regulator connected to the tank service valve, as well as at least one pressure port for enabling pressure in the system to be measured at the location of the port, and said kit comprising:

a valve assembly for connection, in use, to a selected pressure port in the tank system, said valve assembly comprising: a valve housing including a central bore therein and a threaded end connection for providing connection of the valve housing to the pressure port, said central bore including a first portion, and a further portion of a diameter smaller than the remainder of the bore and disposed, in use, adjacent to the pressure port so as to provide restricted fluid flow between the pressure port and the first portion of said central bore: and a valve unit received in the central bore of said valve housing and including a valve operator actuable to open a fluid connection to the pressure port when said valve assembly is connected to the pressure port; and a separate pressure gauge adapted to be carried by tank repair personnel and including a connector for providing connection of said pressure gauge to said valve assembly when said valve assembly is connected to said pressure port, and for, when connected to said valve assembly, providing actuation of said valve operator so that, in use with the tank service valve open, the gauge provides a reading of the pressure at the pressure port and, in use with the system pressurized and the tank service valve closed the gauge provides an indication of the presence of a leak or open line in the propane tank system.

13. A kit as claimed in claim 12, wherein said gauge comprises an indicating needle and further includes a pressure scale, and an ambient temperature scale calibrated relative to said pressure scale so that the position of said needle that provides a reading of gauge pressure on said pressure scale also provides a reading of the corresponding minimum ambient temperature on said ambient temperature scale.

14. A kit as claimed in claim 12 wherein said bore comprises a blind hole in said housing having a closed end, and said inlet opening comprises a drilled hole in said threaded end of the housing in communication with said closed end of said blind hole.

15. A kit as claimed in claim 14 wherein said drilled hole has a diameter of no greater than 0.054 inches.

16. A kit as claimed in claim 15, wherein said pressure gauge comprises an indicating needle and further includes a pressure scale and an ambient temperature scale calibrated relative to said pressure scale so that the position of said needle that provides a reading of gauge pressure on said pressure scale also provides a reading of the corresponding minimum ambient temperature on said ambient temperature scale.

17. A kit as claimed in claim 12 wherein said inlet opening has a diameter of no greater than 0.054 inches.

18. A kit as claimed in claim 17, wherein said pressure gauge comprises an indicating needle and further includes a pressure scale and an ambient temperature scale calibrated relative to said pressure scale so that the position of said needle that provides a reading of gauge pressure on said pressure scale also provides a reading of the corresponding minimum ambient temperature on said ambient temperature scale.

19. A method of manufacturing a valve assembly for connection in an output system of a liquid propane tank including a tank service tank and at least one regulator, said valve assembly comprising: a valve housing having a longitudinally extending bore therein, a valve unit received in said bore in said housing and including a valve seat and an elongate valve operator including a first, actuator end, a second, opposite end and a valve member disposed at said second end and being normally seated on said valve seat to close the valve unit, said valve operator being movable longitudinally in response to a force exerted on the actuator end thereon to unseat the valve member from said valve seat so as to provide opening of the valve unit, said valve housing including a threaded end located opposite to the actuator end of said valve operator for enabling the valve assembly to be screwed into a pressure port in the output system of the tank, said bore in said housing comprising a blind hole defining a closed end of the housing, said method comprising: drilling an inlet opening having a diameter of no greater than 0.054 inches into the closed end of the valve housing to provide communication with said bore in said housing, cleaning out any drilling debris in said bore resulting from said drilling, and thereafter mounting said valve unit in said bore to complete the valve assembly.

20. In combination, a tank service valve for a liquid propane tank, and a further valve assembly, said tank service valve comprising: a first valve housing including a tank connector adapted to be connected to a liquid propane tank and an output connector adapted to be connected to a pressure regulator, a valve unit including a first valve seat disposed with said housing and a valve operator for said valve unit, and a pressure port located in said housing between said tank connector and said output connector, said further valve assembly being received in said pressure port, and said further valve assembly comprising: a second valve housing having a longitudinally extending bore therein, a second valve unit received in said bore in said second valve housing and including a second valve seat and a second, elongate valve operator including a first, actuator end, a second, opposite end and a valve member disposed at said second end and being normally seated on said second valve seat to close the second valve unit, said second valve operator being movable longitudinally in response to a force exerted on the actuator end thereof to unseat the second valve member from said second valve seat so as to provide opening of the second valve unit, said second valve housing including a connector end located opposite to the actuator end of said second valve operator and received in said pressure port of said tank service valve, said connection end of said second housing including an inlet opening in communication with said bore in said second valve housing and said inlet opening having a diameter of no greater than 0.054 inches for restricting fluid flow into said valve assembly.

* * * * *